Patented Apr. 24, 1951

2,550,637

UNITED STATES PATENT OFFICE 2,550,637

PRODUCTION OF ACETALS AND β-HALOALDEHYDES

John W. Copenhaver, Easton, Pa., assignor to General Aniline & Film Corporation, New York, N. Y., a corporation of Delaware No Drawing. Application June 19, 1946, Serial No. 677,918

10 Claims. (Cl. 260—615)

The present invention relates to an improved process for the production of acetals of β-haloaldehydes.

I have found that acetals of β-haloaldehydes may be prepared in good yields by reacting an α,β-ethylenically unsaturated ether with a halogen, such as chlorine or bromine, an alcohol, and an alkaline agent. The reaction proceeds as indicated by the following equation:

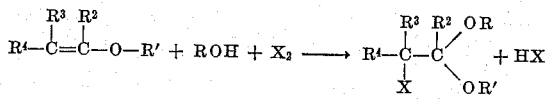

wherein R represents the residue of an aliphatic alcohol and R' is a radical of an alcohol or phenol, including oxygen or sulfur-interrupted hydrocarbon radicals, $R^2$, $R^3$ and $R^4$ stand for hydrogen or hydrocarbon radicals, and X stands for halogen.

As indicated above, the α,β-ethylenically unsaturated ether employed in the present invention may be any one of a wide variety of compounds of this type. As specific compounds of this type may be mentioned the methyl-, ethyl-, propyl-, isopropyl-, n-butyl-, isobutyl-, tert. butyl-, dodecyl-, octadecyl, phenyl-, cresyl-, and benzyl-ethers of such α,β-ethylenically unsaturated alcohols as vinyl-, isopropenyl-, butenyl-, α-phenyl vinyl-, or β-phenyl vinyl-alcohol and the like. Likewise, compounds such as β-methoxy ethyl vinyl ether and β-methyl thioethyl vinyl ether may be employed, if desired.

From a consideration of the nature of the reaction, it will be apparent that the particular β-haloaldehyde whose acetals are prepared will depend on the particular ethylenically unsaturated alcohol whose ether is employed as a reactant. The present invention is of particular interest for the production of acetals of β-haloacetaldehyde in which $R^2$, $R^3$ and $R^4$ are hydrogen and for its production the vinyl ethers of the formula $CH_2=CH-O-R'$, in which $R^2$, $R^3$ and $R^4$ are also hydrogen will be employed as a reactant and from a technical standpoint the lower alkyl (methyl-, ethyl- and up through butyl-) vinyl ethers are of particular interest.

It will also be apparent that the alcohol employed as a reactant in the present invention will depend on the particular acetal which is desired as a product. In general, the symmetrical lower alkyl acetals are preferred and therefore the alcohol employed will generally correspond to the alcohol component of the ethylenically unsaturated ether and will thus be a lower aliphatic alcohol such as methyl or ethyl. However, higher aliphatic alcohols, such as dodecyl- or octadecyl-alcohol and the like can be employed, if desired.

As alkaline agents that may be used in the process of this invention, I have found that the oxides, hydroxides, alcoholates, carbonates and bicarbonates of the alkali metals, e. g., lithium, sodium and potassium, and the alkaline earth metals, e. g., calcium and barium, are particularly valuable.

The reaction may be conducted through a relatively wide temperature range. While temperatures as low as —60° C. have been employed, there is no particular advantage in employing temperatures much below 0° C. Likewise, temperatures above about 50° C. are preferably avoided since there is no particular advantage in their use, although the process is operative up to 150° C. or even higher. When the temperature employed is above the boiling point of either the α,β-unsaturated ether or the alcohol to be reacted, the process can be carried out at superatmospheric pressure; otherwise, atmosphere pressure may be employed advantageously.

It has also been found that the relative proportions of the reactants, i. e., the α,β-unsaturated ether, the alcohol, the halogen and the alkaline agent are not critical and can be varied over a considerable range. For reasons of economy and in order to obtain maximum yields of the haloacetals, an excess of the less expensive reagents—alcohol, halogen and alkaline agents—is generally employed.

The following examples, in which the parts are by weight, illustrate specific embodiments of the present invention:

Example 1

Twenty-seven and one-half parts of metallic sodium was dissolved in 400 parts of absolute methanol in a glass reactor fitted with a stirrer, a thermometer, and an inlet tube for chlorine. The reaction mixture was protected from moisture and carbon dioxide by means of calcium chloride and soda lime tubes. The solution was cooled to —60° C. with a mixture of solid carbon dioxide and methanol and 58 parts of methyl vinyl ether added. Seventy-six and one-half parts of chlorine was passed into the mixture during 2½ hours while maintaining the mixture at a temperature between —60° and —50° C. The reaction mixture was then stirred for an additional hour at —60° C. Approximately 250 parts of methanol were then distilled from the reaction mixture. Two hundred parts of water were added to dissolve the sodium chloride and 80 parts of methanol distilled. The reaction vessel was then cooled and the water-insoluble layer separated. The aqueous solution was extracted twice with 180 parts of chloroform and the chloroform extracts and the water-insoluble layer were combined and distilled. There was thus obtained 114 parts (92% of the theoretical) of dimethyl chloroacetal boiling at 120–130° C. and having a $n_D^{25}$ of 1.4125.

In an experiment in which the above procedure was employed, except that the temperature of the reaction was maintained between −5 and 0° C., an identical yield of dimethyl chloroacetal was obtained.

*Example 2*

One hundred and twenty parts of flake sodium hydroxide was dissolved in 800 parts of methanol in an apparatus similar to that described in Example 1. The solution was cooled to −5° C. and 116 parts of methyl vinyl ether added. During the course of 4½ hours 174 parts of chlorine was added while keeping the temperature of the reaction mixture between −5 and −3° C. Upon working up the reaction mixture, using the general methods described in Example 1, there was obtained an 85% yield of dimethyl chloracetal.

*Example 3*

A suspension of calcium methylate in methanol was prepared by refluxing 192 parts of calcium carbide in 120 parts of absolute methanol until acetylene was no longer evolved. The suspension was cooled to −5° C. and 116 parts of methyl vinyl ether was added. One hundred and fifty-four parts of chlorine was then passed into the vigorously stirred mixture while maintaining the temperature at −5° to 0° C. The reaction mixture was then steam distilled, the insoluble dimethyl chloroacetal separated from the aqueous distillate by extraction with chloroform, and the solution dried and distilled. There was thus obtained 204 parts of dimethyl chloroacetal.

I claim:

1. The process of producing acetals of β-haloaldehydes which comprises reacting an α,β-ethylenically unsaturated ether selected from the group consisting of alkyl- and aryl-α,β-ethylenically unsaturated ethers of the formula

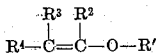

wherein R' represents a member of the group consisting of alkyl and aryl radicals and $R^2$, $R^3$ and $R^4$ represent a member of the group consisting of hydrogen and alkyl and aryl radicals, with an akyl alcohol, a halogen selected from the group consisting of chlorine and bromine and an alkaline agent.

2. The process as defined in claim 1 wherein the α,β-ethylenically unsaturated ether is a lower alkyl-α,β-ethylenically unsaturated ether.

3. The process as defined in claim 2 wherein the aliphatic alcohol specified is a lower alkyl alcohol.

4. The process as defined in claim 3 wherein the halogen specified is chlorine and an excess of said chlorine and said lower alkyl alcohol is employed.

5. The process of producing acetals of β-haloacetaldehyde which comprises reacting an alkyl vinyl ether with an alkyl alcohol, a halogen selected from the group consisting of chlorine and bromine and an alkaline agent.

6. The process as defined in claim 5 wherein the alkyl alcohol specified is a lower alkyl alcohol, and the alkyl vinyl ether specified is a lower alkyl vinyl ether.

7. The process as defined in claim 6 wherein the halogen specified is chlorine.

8. The process as defined in claim 5 wherein the halogen specified is chlorine.

9. The process of producing acetals of β-haloacetaldehyde which comprises reacting a lower alkyl vinyl ether with an excess of a lower alkyl alcohol, a halogen selected from the group consisting of chlorine and bromine and an alkaline agent.

10. The process as defined in claim 9 wherein the halogen specified is chlorine and the alkaline agent specified is an alkali hydroxide.

JOHN W. COPENHAVER.

REFERENCES CITED

The following references are of record in the file of this patent:

UNITED STATES PATENTS

| Number | Name | Date |
|---|---|---|
| 2,000,252 | Reppe et al. | May 7, 1935 |
| 2,330,570 | Filachione | Sept. 28, 1943 |
| 2,411,826 | Filachione | Nov. 26, 1946 |
| 2,433,890 | Cass | Jan. 6, 1948 |

OTHER REFERENCES

Wislicenus: "Justus Liebig's Annalen der Chemie," vol. 192, pages 106–113 (1878), "Ueber Vinylathylather."

Adams et al.: "Organic Reactions," vol. II (1944), pages 69 and 70. Wiley and Sons.